US005622045A

United States Patent [19]
Weimer et al.

[11] Patent Number: 5,622,045
[45] Date of Patent: Apr. 22, 1997

[54] SYSTEM FOR DETECTING AND ACCOMMODATING GAS TURBINE ENGINE FAN DAMAGE

[75] Inventors: Matthew M. Weimer, Indianapolis; Joseph A. Jaeger, Greenwood, both of Ind.

[73] Assignee: Allison Engine Company, Inc., Indianapolis, Ind.

[21] Appl. No.: 473,720

[22] Filed: Jun. 7, 1995

[51] Int. Cl.$^6$ ...................................................... F02C 9/28
[52] U.S. Cl. .................................. 60/204; 60/223; 60/243
[58] Field of Search ............................... 60/39.161, 204, 60/223, 236, 239, 243

[56] References Cited

U.S. PATENT DOCUMENTS

| | | |
|---|---|---|
| 3,852,958 | 12/1974 | Adams et al. . |
| 3,867,717 | 2/1975 | Moehring et al. . |
| 4,159,625 | 7/1979 | Kerr . |
| 4,216,672 | 8/1980 | Henry et al. . |
| 4,294,069 | 10/1981 | Camp ........................................ 60/239 |
| 4,603,546 | 8/1986 | Collins . |
| 4,606,191 | 8/1986 | Collins et al. . |
| 4,722,061 | 1/1988 | Carlisle et al. ........................ 364/494 |
| 4,825,639 | 5/1989 | Krukoski . |
| 4,864,813 | 9/1989 | Krukoski . |
| 4,888,948 | 12/1989 | Fisher et al. . |
| 4,959,955 | 10/1990 | Patterson et al. ......................... 60/204 |
| 5,072,580 | 12/1991 | Patterson et al. ......................... 60/242 |
| 5,133,182 | 7/1992 | Marcos . |
| 5,142,860 | 9/1992 | Strange et al. . |
| 5,259,187 | 11/1993 | Dunbar et al. . |
| 5,259,188 | 11/1993 | Baxter et al. . |
| 5,263,816 | 11/1993 | Weimer et al. . |
| 5,267,435 | 12/1993 | Frenkel et al. . |
| 5,303,545 | 4/1994 | Larkin ...................................... 60/239 |
| 5,345,386 | 9/1994 | Mullen et al. . |

OTHER PUBLICATIONS

Sobey et al. Control of Aircraft and Missile Power Plants Wiley and Sons; New York, 1963. p. 33.

Primary Examiner—Louis J. Casaregola
Attorney, Agent, or Firm—Woodard, Emhardt, Naughton, Moriarity & McNett

[57] ABSTRACT

Foreign object ingestion damage detection and accommodation system for a gas turbine engine system having a gas turbine engine with multiple rotating members, such as a twin spool configuration. System includes speed sensors for sensing the rotational speed of at least two rotating members. Sensors are coupled to a controller which detects damage by comparing the sensed speed of the second rotational member to an expected speed. Expected speed is determined from the sensed speed of the first rotating member using a known characteristic relationship between the the first and second rotating member speeds for the given gas turbine engine design. Thrust loss accommodation is triggered when damage is detected. Accommodation mode provides a synthesized primary thrust control feedback signal in lieu of the sensed signal for a damaged rotational member. Synthesized signal is derived from the sensed speed for the undamaged rotational member.

58 Claims, 10 Drawing Sheets

SYSTEM FOR DETECTING AND ACCOMMODATING GAS TURBINE ENGINE FAN DAMAGE

BACKGROUND OF THE INVENTION

The present invention relates to the detection of damage to a gas turbine engine from foreign object ingestion and to accommodation of such damage.

Many gas turbine engines include a low pressure compressor, a high pressure compressor, a combustor and at least one turbine. The low pressure compressor has an intake through which air at ambient pressure is drawn. The pressure of the air, a working fluid, is increased as it flows through this compressor. At least a portion of the working fluid is passed from the low pressure compressor to an adjacent high pressure compressor aligned therewith. This high pressure compressor further increases the pressure of working fluid flowing through it. Next, high pressure working fluid exiting the high pressure compressor is mixed with fuel and ignited by one or more combustors creating rapidly expanding combustion gases which drive one or more turbines. A turbine extracts power from the combustion gases before these gases exit a rear nozzle as exhaust. In some configurations, a thrust vector is created in the direction opposite the exiting exhaust gases.

One common gas turbine engine configuration has coaxial twin spools. This configuration has a low pressure spool including a low pressure turbine connected by a shaft to a low pressure turbine, and a high pressure spool or core including a high pressure turbine connected by a separate coaxial shaft to a high pressure compressor. Combustors are situated between the high pressure compressor and high pressure turbine of the core, and the core is situated between the low pressure compressor and low pressure turbine along a common working fluid path so that the compressors and turbines are adjacent one another. For a twin spool turbofan engine with a high bypass design, a large portion of the working fluid passing through the intake is bypassed by a stage of the low pressure compressor, a fan, through a bypass duct. The bypassed air typically blends with the exhaust gases exiting the exhaust nozzle. As a consequence, greater efficiency and reduced engine noise result.

Unfortunately, the fan is susceptible to damage when birds, ice, or other foreign objects are ingested into it. The introduction of foreign objects into the air intake can have catastrophic consequences and it has been known that, for example, metal objects have produced serious structural faults in engines particularly during take-off and landing. Such catastrophic results may lead to a stall event within the engine. U.S. Pat. No. 3,852,958 to Adams et al., U.S. Pat. No. 3,867,717 to Moehring et al., and U.S. Pat. No. 4,603, 546 to Collins disclose various schemes to detect stalls resulting from ingestion of a foreign object. However, not all ingestion events result in a stall. Instead, the damage may only cause thrust loss. Indeed, it is desirable to detect foreign object damage which results in a 25% thrust loss irrespective of a stall condition and to accommodate that loss by providing at least 75% of the thrust available prior to damage. Often, when a medium sized object such as a bird or ice is ingested into a high bypass engine, only fan degradation results. This result may be due to centrifugal forces imparted to an object that encounters the fan which drive it outward so that it passes through the bypass duct and avoids entry into the remainder of the engine. Commonly, the damage curls or otherwise deforms fan blades, and so reduces the ability of the fan to pump air for a given rotational speed. In this instance, an unexpected change of relative rotational speed between the fan and other rotating members is likely, but not a stall. Consequently, what is needed is a way to detect fan damage based on relative speed and to accommodate that condition by recovering thrust to a predictable level.

With the advent of digital avionics control systems, more sophisticated approaches to fan damage detection have arisen. U.S. Pat. Nos. 4,959,955 and 5,072,580 both to Patterson et al. are one such approach. These patents rely on measurement of the Engine Pressure Ratio (EPR) which is the ratio of pressure leaving the gas turbine to the pressure entering the compressor. This detection system is based on the unique relationship between engine air flow, exhaust nozzle area and engine pressure ratio for a turbofan that is undamaged. Fan damage for an EPR controlled system results in reduced fan speed and air movement capability for a given thrust setting. Specifically, detection is possible by comparing the actual EPR for the damaged fan to the predetermined EPR, air flow, and exhaust nozzle area relationship for the undamaged fan. This EPR error based detection scheme integrates well with an overall EPR thrust control system which uses EPR as a primary feedback signal, and already includes a number of pressure sensors. Once fan damage is detected with this system, adjustment of the exit area of a variable exit nozzle is made to correct for the EPR error measured, and the EPR thrust control system is abandoned in favor of an unspecified base mode control system.

Unlike an EPR based thrust control system of the Patterson et al. patents, other thrust control systems exist which do not rely on pressure measurements along the gas turbine engine. For example, one scheme measures the fan speed as the primary feedback signal. This thrust control employs a speed sensor in lieu of the pressure sensors used in an EPR based thrust control system. Furthermore, not all gas turbine engines have a variable exit nozzle which may be adjusted in response to detected damage. Thus, a need still exists for a fan damage detection and recovery system that readily integrates with a fan speed thrust control system and provides for predictable thrust recovery without resort to a variable exit nozzle adjustment.

SUMMARY OF THE INVENTION

Among the aspects of the present invention is a system to detect and accommodate damage from foreign object ingestion. One configuration of equipment for this system comprises a gas turbine engine defining a working fluid pathway with a first rotating member and a second rotating member. These rotating members may be compressors, turbines, or spools each configured to rotate in response to a working fluid flowing along the pathway. A first sensor provides a first speed signal corresponding to rotational speed of the first rotating member, and a second sensor provides a second speed signal corresponding to rotational speed of the second rotating member. A controller is coupled to the first and second sensors which has a logic system of either an analog, digital or hybrid variety.

One feature of the present invention using this equipment is the detection of damage to a gas turbine engine due to foreign object ingestion. The damage detection system measures the speed of the multiple rotating members and declares damage when the relative difference in the rotating member speeds does not correspond to a known relationship for the given engine design. Notably, only two speed sensors are needed to instrument this system in its most basic form whereas an EPR system requires at least three sensors. Furthermore, this system integrates well with a thrust control system already using speed as primary feedback.

The steps to detect the damage include: (1) sensing the speed of the first rotating member, (2) sensing the speed of the second rotating member, (3) establishing an expected speed of the second rotating member from the first rotating member speed, (4) determining a damage error by comparing the second rotating member speed to the expected speed, (5) detecting damage by comparing the damage error and a threshold indicative of damage to the gas turbine engine, and (6) recovering thrust in response to detected damage. Furthermore, the damage detection steps may be repeated a number of cycles as part of the overall scheme.

Signals within the controller corresponding to these detection steps include: an expected speed signal determined from the first rotating member speed, a damage error signal determined by comparison of the expected speed signal to the second speed signal, and a damage detection signal determined by comparison of the damage error signal and a threshold indicative of damage to the first rotating member. Furthermore, the controller may generate a signal in response to the damage detection signal which activates a damage accommodation mode.

Additional features of the present invention include various refinements to the basic damage detection scheme. Equipment used to provide these refinements comprises a temperature sensor providing a temperature signal and a mach number sensor providing a mach number signal. Corresponding additional steps using this equipment include: (7) sensing a temperature, (8) correcting the speeds of the first and second rotating members for temperature, (9) adjusting the damage error for compressor variable geometry hysteresis, (10) adjusting the damage error for engine bleed, (11) establishing a deviation of the engine from nominal, and (12) adjusting the damage detection comparison of the basic detection scheme with the deviation. Establishing this deviation from nominal may include repeating the first four steps of the basic detection scheme to determine an "average" deviation. Furthermore, to avoid false triggers in sensitive systems, the damage detection step may be repeated a number of times for confirmation purposes before activating a thrust recovery mode.

Correspondingly, the controller may generate several refining signals, including: a compressor variable geometry hysteresis adjustment signal from said second speed signal, an engine bleed signal corresponding to a given second rotating member speed loss, a deviation from nominal signal for adjusting the damage error signal, and an operating characteristic signal corresponding to an operating relationship between speed of the first rotating member and speed of the second rotating member. Similarly, the controller corrects the speed signals to the temperature signal. The controller further determines the expected speed signal from the mach number and characteristic signals. Also, the controller further determines the damage error signal from the compressor variable geometry hysteresis adjustment signal and the engine bleed signal. In addition, the controller further determines the damage detection signal from the deviation adjustment signal.

An additional aspect of the present invention is a thrust recovery system which is intended to compensate for the loss in thrust resulting from damage to the fan. Generally, the same equipment used for damage detection can be used for this accommodation mode further facilitating integration with a speed based thrust control system. However, a thrust modulator, such as a fuel regulator, is required to effectuate thrust control. This thrust recovery control system employs known relationships between the relative speeds of a first rotating member and a second rotating member. This known relationship or characteristic is used with the measured speed of the undamaged second rotating member to synthesize a signal corresponding to the speed of an undamaged first rotating member once damage to the first rotating member has been detected.

The steps for this accommodating thrust control system include: (1) determining a requested speed for the first rotating member corresponding to a desired thrust, (2) sensing a second rotating member speed, (3) establishing a synthesized speed for the first rotating member from the second rotating member speed, (4) generating a control error by comparing the requested speed to the synthesized speed, and (5) modulating thrust of the gas turbine engine in response to the control error.

A controller coupled to the second rotating member sensor correspondingly includes the following signals: a requested speed signal corresponding to a first rotating member speed required to obtain a desired thrust from said engine, a synthesized speed signal corresponding to the expected speed of the undamaged first rotating member as determined from the second rotating member speed signal, and a control error signal determined by comparing the requested speed signal to the synthesized speed signal. The thrust modulator coupled to the controller and the engine responds to the control error signal to modulate thrust of the engine.

Consequently, it is one object of the present invention to detect damage from foreign object ingestion to a gas turbine engine having multiple rotating members.

It is another object of the present invention to determine a damage detection threshold in correspondence with a maximum acceptable thrust loss.

A further object of the present invention is to accommodate detected damage by switching to a thrust control system which reliably recovers at least a predictable portion of the thrust commonly lost due to foreign object ingestion.

An additional object of the invention is to provide a damage detection and accommodation system which is robust and integrates well with existing thrust control systems.

DESCRIPTION OF THE PREFERRED EMBODIMENT

Figure 1:
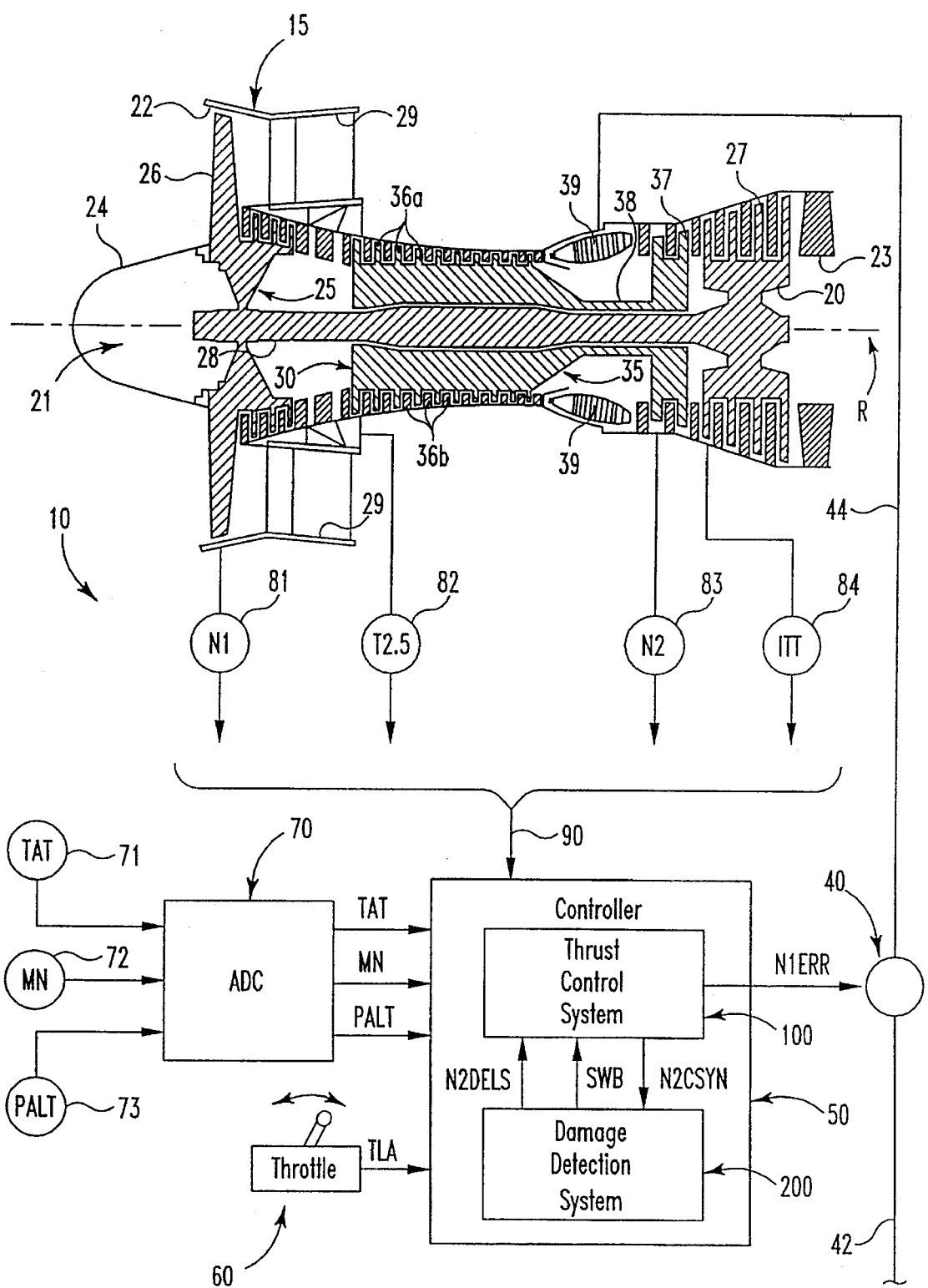
FIG. 1 is a schematic representation of one embodiment of a gas turbine engine system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art ho which the invention relates.

Referring to FIG. 1, one embodiment of the present invention is shown. Specifically, gas turbine engine system 10 is illustrated with gas turbine engine 15 coupled to fuel regulator 40 and controller 50. Typically, gas turbine engine system 10 would be used as a thrust source for an aircraft.

Gas turbine engine 15 is a typical twin spool configuration defining a working fluid pathway 21 with intake 22, exhaust outlet 23, and bypass duct 29. Adjacent intake 22 is hub 24 connected to gas turbine engine 15. Low pressure compressor 25 has fan 26 as a first stage. Furthermore, low pressure compressor 25 is connected to low pressure turbine 27 by an inner shaft 28 forming a low pressure spool 20 which rotates about rotational axis R. Gas turbine engine 15 also includes a high pressure spool or core 30 which is situated along working fluid pathway 21 between the low pressure compressor 25 and low pressure turbine 27. Core 30 includes a high pressure compressor 35 connected to a high pressure turbine 37 by outer shaft 38 which rotates about axis R independent of the rotation of low pressure spool 20. Between the high pressure compressor 35 and high pressure turbine 37 are combustors 39. Combustors 39 are provided fuel by fuel feed line 44. Fuel feed line 44 is controllably supplied by fuel regulator 40.

Gas turbine engine 15 includes several members rotating which are driven by working fluid as it flows along pathway 21. These rotating members include fan 26, compressors 25 and 35, turbines 27 and 37, low pressure spool 20 and core 30.

High pressure compressor 35 includes turbine blades 36a interleaved with turbine stators 36b. Turbine stators 36b are each configured to turn about a variable geometry axis along its length which is generally perpendicular to axis R. Each stator 36b is positioned with respect to its variable geometry axis to maximize high pressure compressor 35 efficiency. This Compressor Variable Geometry (CVG) is adjusted by actuators linked to stators 36b (not shown).

The mechanical operation of high bypass gas turbine engine 15 is in the conventional manner whereby air as a working fluid is drawn in through intake 22, pressurized by compressors 25 and 35, mixed with fuel and combusted by combustors 39.

The rapidly expanding gases resulting from this combustion drive turbines 27 and 37 which extract power therefrom including the power needed to rotate compressors 25 and 35.

The working fluid exits low pressure turbine 27 through outlet 23 generating thrust in a direction opposite the direction of the exiting exhaust gases. In one preferred embodiment, gas turbine engine 15 is an AE 3007 turbofan engine manufactured by Allison Engine Company of Rolls Royce Aerospace Group. In an alternative preferred embodiment of the present invention, the gas turbine engine does not include a high bypass fan stage. Furthermore, in another preferred embodiment, the gas turbine engine is a turboshaft engine which powers another device via a mechanical linkage so that no appreciable thrust results or is desired. Finally, it is envisioned that the present invention may be used with a gas turbine engine having various arrangements of rotating members including additional compressors, turbines, or spools driven by a working fluid.

The thrust generated by gas turbine engine 15 corresponds to fuel selectively provided over fuel line 44 by fuel controller or fuel regulator 40. Fuel supply line 42 supplies fuel to fuel regulator 40 from a fuel source (not shown) which controls fuel flow to combustors 39 in response to signal N1ERR from controller 50. Thrust of gas turbine engine 15 is modulated by fuel flow so that fuel regulator 40 behaves as a thrust modulator.

Controller 50 includes a thrust control system 100 providing N1ERR, and a damage detection system 200 for detecting damage from ingestion of a foreign object. Damage detection system 200 contains logic to determine when damage from foreign object ingestion has occurred. Damage detection system 200 provides signals N2DELS, SWB, and N2CSYN to thrust control system 100 for use after damage is detected. Thrust control system 100 reacts to detected damage by switching thrust control modes in order to accommodate the damage.

Thrust control system 100 and damage detection system 200 are responsive to a number of signals received by controller 50. These signals may be in an analog or digital format using such techniques as would occur to those skilled in the art. First, controller 50 receives throttle angle TLA from cockpit thrust control throttle 60. TLA corresponds to a desired engine thrust. In one preferred embodiment, TLA is an analog electrical signal provided by a sensor in throttle 60.

Other signals provided to controller 50 correspond to various environmental parameters. First, Total Air Temperature TAT corresponding to the surrounding air temperature is sensed by sensor 71. Second, Mach Number MN corresponding to the rate of travel of the corresponding aircraft with respect to the speed of sound is sensed by sensor 72. Third, pressure altitude PALT corresponding to the altitude of the system is sensed by sensor 73. In the preferred embodiment shown, these three signals are supplied as analog electrical signals to Air Data Computer (ADC) 70 which converts them to a digital signal format before being received by controller 50.

Controller 50 also receives four signals corresponding to various performance parameters of gas turbine engine 15. First, rotational speed of low pressure spool 20, N1, is sensed by sensor 81. Second, T2.5 is sensed by sensor 82 and corresponds to temperature between compressors 25 and 35. Third, corresponding to rotational speed of the core 30, N2 is sensed by sensor 83. Fourth, ITT is sensed by sensor 84 and corresponds to interturbine temperature—the temperature between turbines 27 and 37. In one preferred embodiment, signals N1, T2.5, N2 and ITT are provided to controller 50 as analog electrical signals which are then converted into a digital format therein. Collectively, these signals are designated by feedback path 90.

In one preferred embodiment, the controller 50 includes a Full Authority Digital Engine Control (FADEC). In the FADEC, the thrust control system 100 and damage detection system 200 are embodied as a computer program integrated with various other controller modules. The FADEC digitizes all signals received in an analog format for use as a corresponding variable or value by a computer program executed therein. In one variation of this embodiment, two FADECs are used in a dual redundant configuration (not shown) to provide enhanced reliability in the event one fails.

In an alternative embodiment, thrust control system 100 and digital detection system 200 are contained in separate devices which collectively are designated controller 50. Similarly, it is envisioned that controller 50 may comprise various combinations of physical equipment as would occur to one skilled in the art. Furthermore, it is envisioned that some or all of the thrust control system 100 and damage detection system 200 are "hard-wired" into electronic hardware as opposed to exclusive implementation in a software computer program. Such variations are accomplished using techniques known to those skilled in the art.

Figure 2:
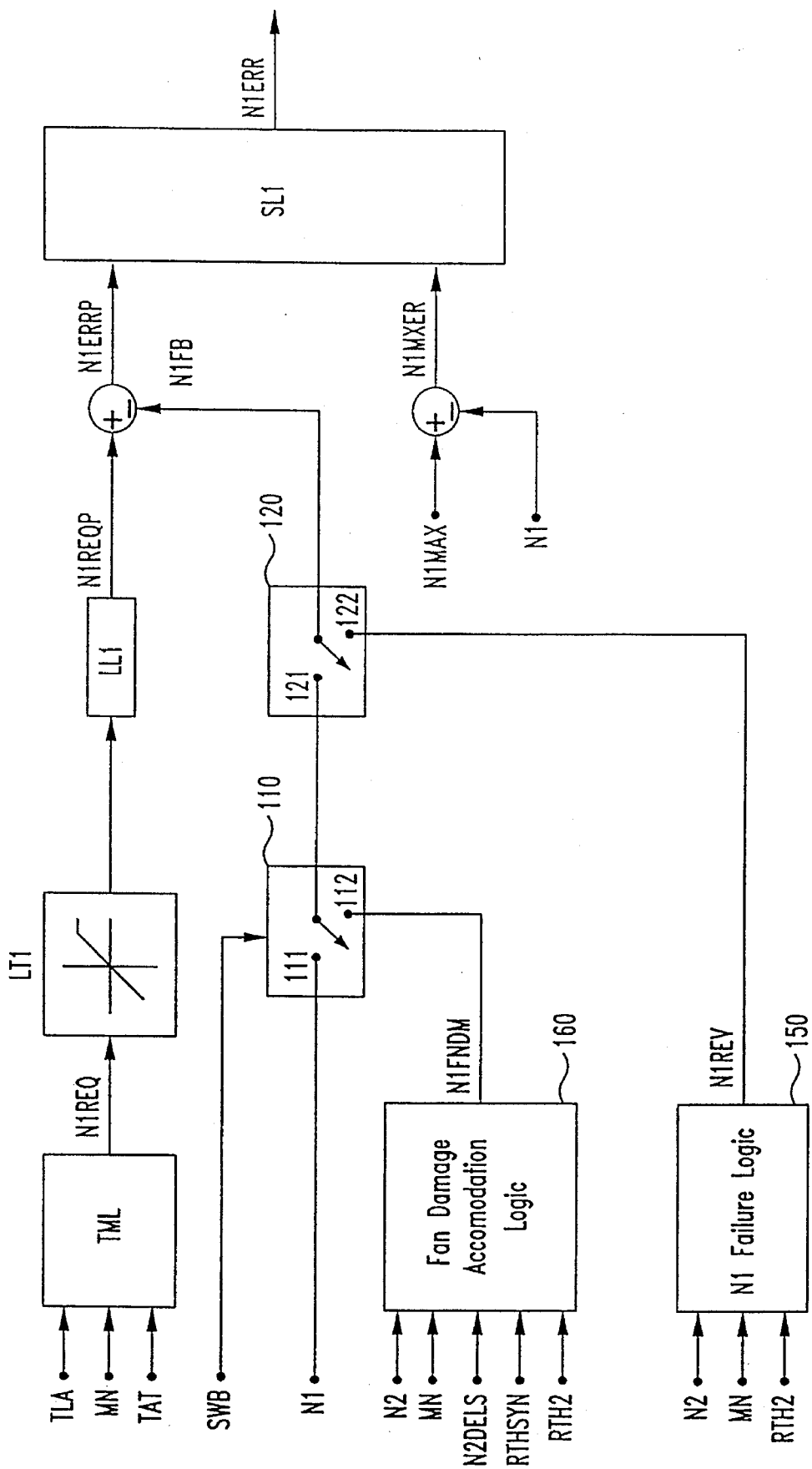
FIG. 2 is a more detailed schematic representation of the thrust control system shown in FIG. 1.

Next, referring to FIG. 2, thrust control system 100 is further depicted. This system uses mechanical fan speed N1, as a primary feedback control signal when the pole of switch 110 engages contact 111 and the pole of switch 120 engages contact 121 so that N1FB=N1. Serially connected switches 110 and 120 are depicted as schematic devices which may be physically or logically embodied as would occur to one skilled in the art. Also, two mechanical switches (not shown), one redundant with each switch 110 and switch 120, are envisioned which can be used to test the alternate signal paths corresponding to contact 112 of switch 110 and contact 122 of switch 120.

Next, the adjustable control signal, N1REQP, which is compared with N1FB, is discussed. This control signal is determined from the desired thrust corresponding to TLA, MN, and TAT. These signals enter thrust management logic TML which generates a requested speed designated N1REQ. N1REQ corresponds to desired thrust selected by throttle 60 with corrections for environmental factors MN and TAT. Next, N1REQ is limited by limiter LT1 to a maximum value slightly below the absolute maximum peculiar to the engine and control system design. As a result, LT1 provides a tolerance guardband. The signal is then lagged by lag logic LL1 to filter noise. The result is output as signal N1REQP.

Feedback signal N1FB is subtracted from modified control signal N1REQP to obtain control error signal N1ERRP corresponding to N1 speed error. N1ERRP enters select low logic SL1 along with N1MXER. SL1 outputs the smaller of the two input values. N1MXER is a fail-safe signal which is the difference between N1 and the absolute maximum safe speed of fan 26, N1MAX. In a normal control mode, N1MAX is always greater than the guardband value of limiter LT1. Consequently, N1ERRP will always be less than N1MXER provided that equipment is operating correctly. Thus, N1ERR output from SL1 normally equates to N1ERRP. Notably, gas turbine engine system 10 has a closed control loop. Referring back to FIG. 1, output N1ERR of select low logic SL1 is the primary signal controlling fuel regulator 40. Gas turbine engine 15 responds to fuel flow adjustments with a change in speed of turbines 27 and 37. The loop continues from gas turbine engine 15 with sensor 81 signal N1 providing closure. This loop provides negative feedback given the negative summation of N1 with control input N1REQP.

Referring again to FIG. 2, an alternate N1 source is discussed. Specifically, if N1 sensor 81 fails, then the logical switch 120 is thrown to engage contact 122 so that N1FB=N1REV. N1REV is an "artificial N1" derived from the MN, and temperature correction factor RTH2 by N1 failure logic 150.

Another alternative N1 source is from fan damage accommodation logic 160. In this case, the pole of switch 110 engages contact 112, but the pole of switch 120 remains connected to contact 121 so that N1FB=N1FNDM. This repositioning of switch 110 is accomplished schematically by signal SWB from damage detection system 200. In one preferred embodiment, switch 110 is a software switch with SWB being a discrete trigger signal. The N1 failure logic signal N1REV effectively overrides the fan damage accommodation logic signal N1FNDM when switch 120 is also thrown. Fan damage accommodate logic 160 provides a synthesized fan speed N1FNDM when foreign object ingestion damage is detected. When such damage occurs, the ability of the fan 26 to pump air is generally degraded. Because the control system normally employs fan speed N1 as a primary feedback signal, the control system attempts to keep N1 fixed despite the damage. As a result, N2 drops significantly, and a thrust loss results for this fixed speed. To accommodate this loss, mechanical speed, N1, of a damaged fan is inadequate as a primary feedback signal once foreign object ingestion damage is detected.

One aspect of the present invention is to provide a synthetic N1 feedback signal determined from N2 which accommodates the thrust loss. It is known to those of skill in the art that a unique relationship exists between the speed of the low pressure spool 20 and core 30 such that N1=f(temperature, N2, MN) for a given engine design. Thus, a family of curves corresponding to various MN and temperatures can be used to determine an expected N1 or N2 given the corresponding N2 or N1. However, to limit the complexity, correction factors are used such as temperature. As a result of temperature correction, only MN and N2 are needed to discover an expected N1 or N2 speed. Moreover, the influence of MN is generally minor at typical operating speeds. Indeed, it may be ignored in other preferred embodiments.

One correction temperature commonly used is engine inlet temperature T2. Although gas turbine engine system 10 does not measure T2 directly, T2 can be determined from total air temperature TAT by removing the influence of Mach Number MN, where T2=f(MN, TAT). T2 is used by controller 100 to generate a corrected fan speed, N1C=f(N1, T2)=N1*(X)$^{-0.5}$, where X=T2÷518.67; 518.67 being standard Rankine temperature. Similarly, core speed is corrected to T2 as N2C2=f(N2, T2)=N2*(X)$^{-0.5}$. Also N2 is corrected to core inlet temperature, T2.5, as N2C=f(N2,T2.5)= N2*(Y)$^{-0.5}$ where Y=T2.5÷518.67. Furthermore, when T2.5 is unavailable or the lag common to a ruggedized T2.5 sensor 82 is not acceptable, then a synthetic T2.5, T25SYN, can be generated from a known relationship between N1 and T2 for the given engine design.

It is envisioned that in alternative preferred embodiments, temperature correction factors would not be required, because the family to temperature dependent relationships is otherwise available, temperature effects are negligible, or temperature does not change appreciably. Similarly, MN may be disregarded in some alternative preferred embodiments.

Figure 3:
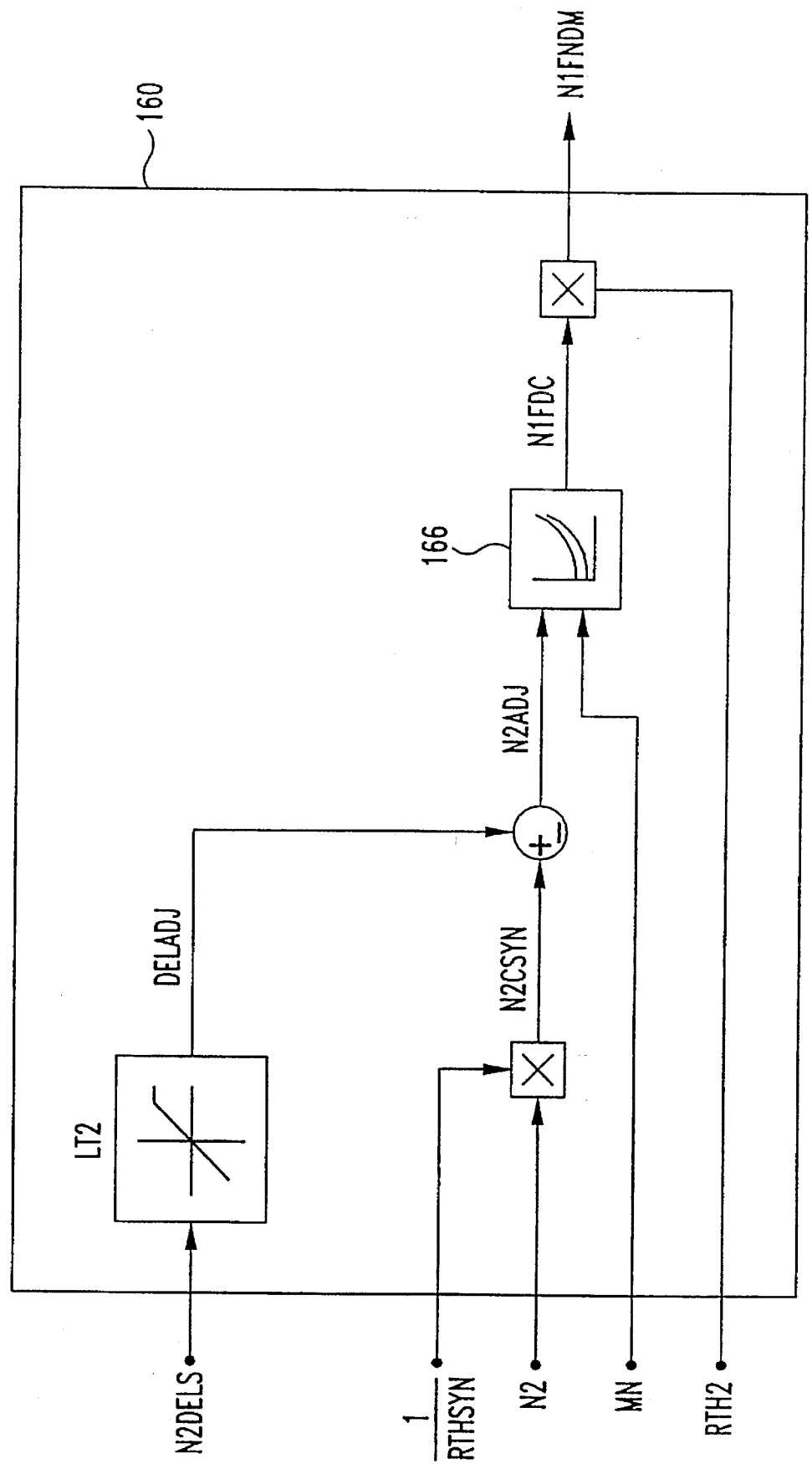
FIG. 3 is a more detailed schematic representation of the N1 failure logic shown in FIG. 2.

Referring next to FIG. 3, the determination of a synthesized N1 feedback signal from fan damage accommodation logic 160 is depicted. Essentially, this synthesized speed is determined from N2 using the known relationship of N2 to N1. First, the product of N2 and correction factor $(RTHSYN)^{-1}$ is generated as N2CSYN. The factor RTHSYN (root theta-synthesized) $RTHSYN=(T25SYN\div518.67)^{-0.5}$, corrects for variations of the N1 versus N2 relationship with temperature. T2.5SYN is used in lieu of actual T2.5 temperature from sensor 82 because it may lag actual performance temperatures unacceptably.

The product N2CSYN is next summed with DELADJ. DELADJ is a range-limited version of N2DELS. N2DELS accounts for the deviation of the engine from a nominal N1 versus N2 operating characteristic signal as provided by the damage detection system 200. The N2DELS value is limited by limiter LT2 to a maximum range based on expected variation from nominal for the given engine design. Thus, the limited deviation adjustment signal, DELADJ, is subtracted from N2CSYN to adjust to nominal. Notably, if the engine is of nominal design or deviation is negligible and T25SYN is at standard, then N2=N2ADJ, rendering correction and adjustments unnecessary.

Next, N2ADJ and MN are used to determine a corresponding N1C (N1 corrected to T2) as represented by operating characteristic signal source 166. The result is N1FDC. In one preferred embodiment, source 166 is embedded as a look-up table in software. In an alternative embodiment, source 166 may be programmed as one or more equations.

Finally, to produce the synthetic N1, N1FDC is "uncorrected" for T2 by multiplication with factor $RTH2=(T2/518.67)^{0.5}$. The result N1FNDM is a synthesized mechanical N1 for an undamaged fan 26 based on the measured N2. Before the accommodation mode is triggered by damage detection system 200, N1 will remain fixed, but N2 drops causing thrust loss. Upon triggering the accommodation mode, N1FNDM will be generated as the N1 corresponding to N2 for an undamaged fan. Because the efficiency of low pressure spool 25 is degraded, the initial N1FNDM will be significantly lower than N1 and the resulting increase in N1ERR will cause fuel regulator 40 to increase fuel flow to gas turbine engine 15 to recover thrust to make up for the degraded fan. Requested speed signal N1REQP will operate as before the damage. N1FNDM is principally determined from N2; however, the interim correction factor T25SYN relies on measured N1 and T2. It is believed T25SYN accounts to some extent for the damage done to the fan 26 given the participation of N1 in T25SYN determination. In other preferred embodiments, measured T2.5 or T2 could be used in lieu of T2.5SYN. In still another preferred embodiment, no temperature correction is necessary.

Because fan 26 has been damaged, complete thrust recovery may not be possible. Indeed, fail-safe maximums typically become the limiting operating parameters for various aspects of a gas turbine engine 15 with foreign object ingestion damage. Principally, N1, N2, and ITT are monitored and the control system is limited so that maximum fail-safe values for these parameters, as determined from engine design, are not exceeded. However, for the typical ingestion damage caused by a bird or ice, thrust recovery of at least 75% is possible.

Another aspect of the present invention is the damage detection system 200. This system is based on the relative change in N1 and N2 as a result of damage. For an N1 controlled system, N1 is held fixed by the system until damage is detected and accommodation triggered. As a result, the reduced air pumping capability of fan 26 results in an unexpected N2 drop. Comparably, for an N2 or EPR based control system, N1 increases to maintain the constant EPR or N2 after the damage. An expected speed for either N1 or N2 is determined from a sensed or measured value for N2 or N1, respectively, using the characteristic relationship of N1 versus N2 known for the given engine design (or similarly N1C versus either N2C2, N2C, or N2CSYN). A damage error signal is determined by comparing this expected speed to the sensed speed for the selected rotating member. A damage detection signal results if the damage error exceeds a threshold indicative of damage.

Figure 4:
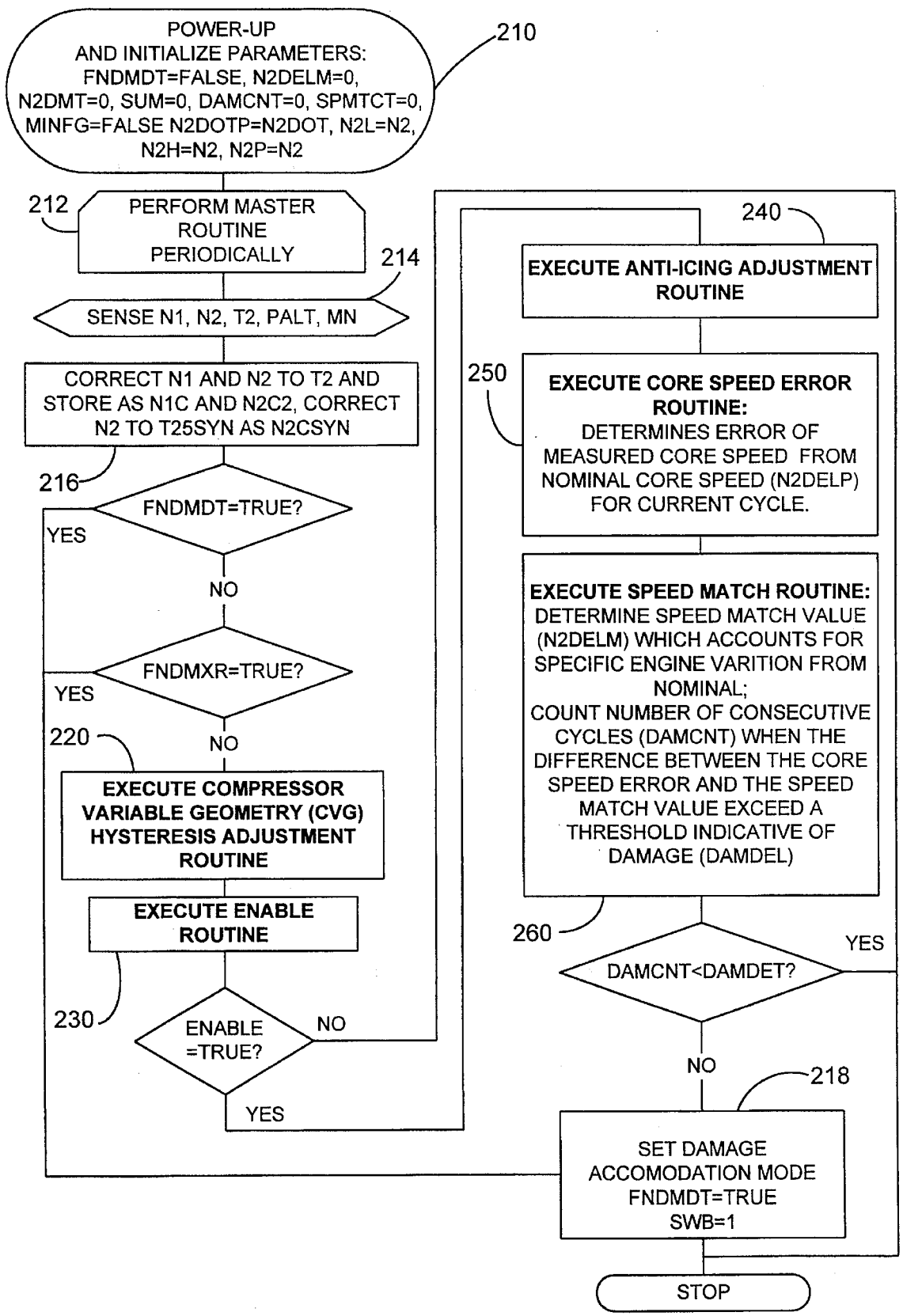
FIG. 4 is a flow chart of the master routine for one embodiment of the damage detection system shown in FIG. 1.

Referring to FIG. 4, a flow chart representing one preferred embodiment of damage detection system 200 is illustrated. This embodiment reveals the logical routine required to create a computer program or a digital state machine using such techniques as are known to those skilled in the art.

Starting with initialization step 210, the equipment of controller 100 containing damage detection system 200 is powered on and variables are initialized. The damage detection system 200 master routine 212 is performed periodically as symbolized by the next block. In one preferred embodiment, a cycle of master routine 212 is performed every 125 milliseconds in a FADEC. As referenced herein, it should be understood that the terms "variable" and "value" include reference to a corresponding signal within controller 50.

Control flows next to operation block 214 wherein N1, N2, T2, PALT, and MN are sensed and assigned to correspondingly named signals for later use by the routine. Next, operation block 216 corrects N1 and N2 for temperature T2 derived from sensed values of MN and TAT. Also, N2 is corrected to T25SYN as N2CSYN.

The first conditional for master routine 212 checks whether FNDMDT=TRUE. If FNDMDT=TRUE, damage has already been detected. As a result, master routine 212 jumps to operation block 218 to set the damage accommodation mode and trigger fan damage accommodation logic 160 of thrust control system 100 via SWB. Similarly, a second conditional is encountered, checking whether FNDMXR=TRUE. FNDMXR is the damage flag corresponding to damage detected in a dual redundant controller 50 operating its own damage detection system 200. This second conditional is optional if no redundant damage detection system is used or when coordination with a redundant damage detection system is otherwise provided.

Figure 5:
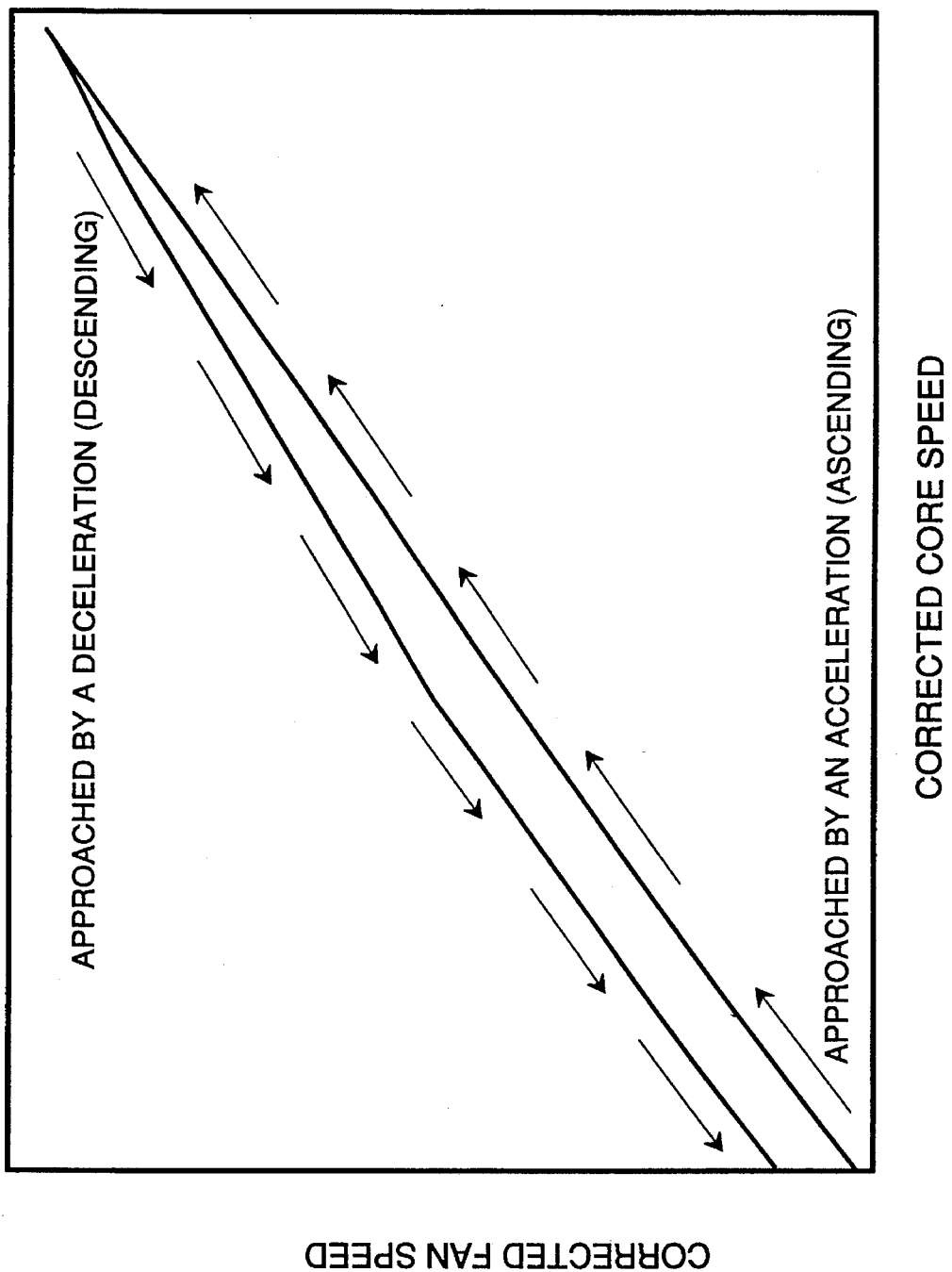
FIG. 5 is a graph depicting compressor variable geometry hysteresis for a given corrected fan speed versus corrected core speed characteristic relationship.

If FNDMDT and FNDMXR are both false, control passes to Compressor Variable Geometry (CVG) hysteresis adjustment routine 220. Referring to FIG. 5, a chart of a CVG hysteresis loop is illustrated for a given temperature corrected N1 versus corrected N2 speed relationship. This curve reveals a hysteresis gap depending on whether the corresponding engine was accelerating (lower curve) or decelerating (upper curve). This hysteresis results from mechanical tolerances of actuators and associated linkage for stators 36b of the CVG system (see FIG. 1 and accompanying text).

Figure 6:
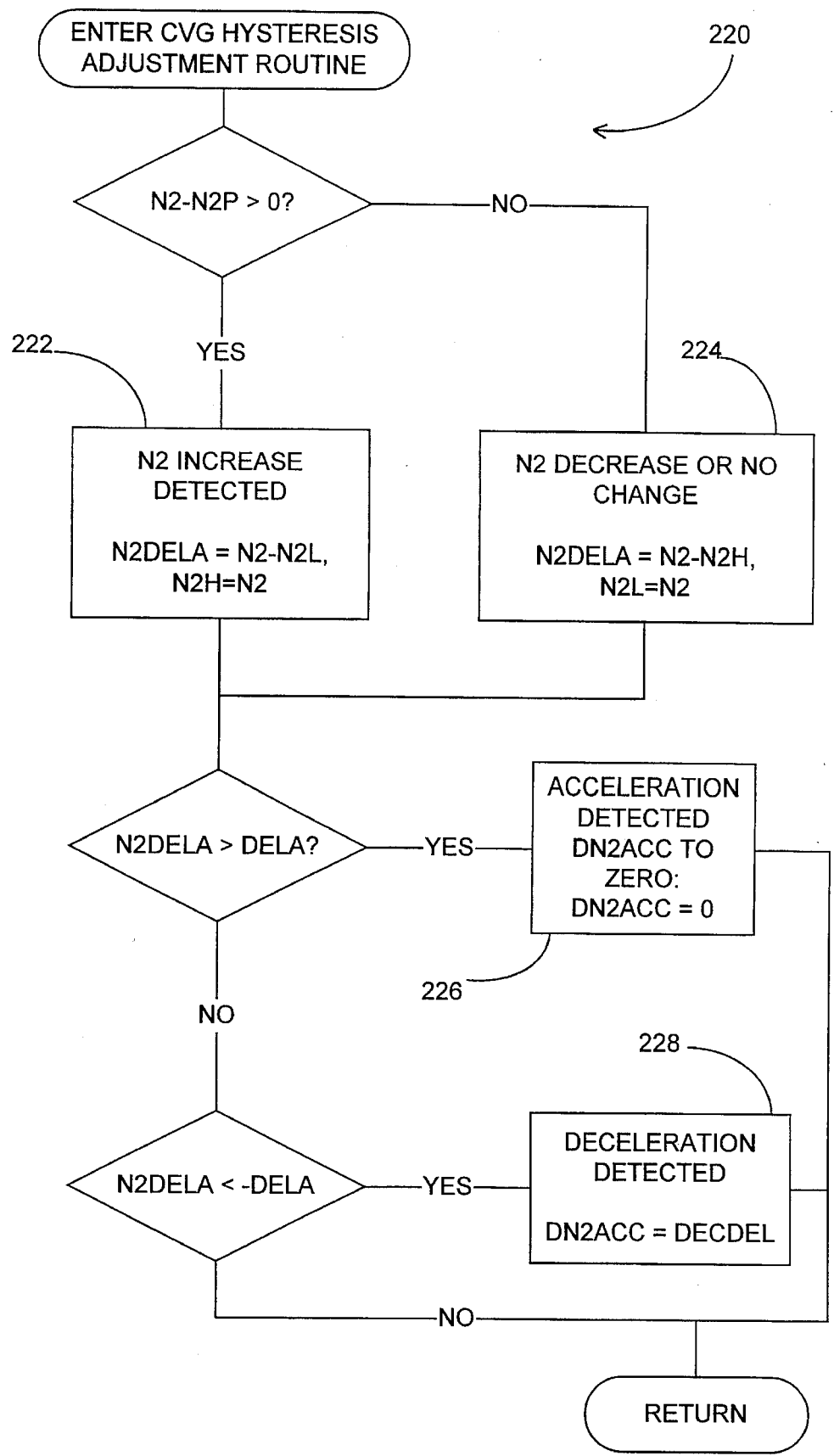
FIG. 6 is a more detailed flow chart of the compressor variable geometry hysteresis adjustment routine depicted in FIG. 4.

One way to account for CVG hysteresis is provided by CVG hysteresis adjustment routine 220 described in FIG. 6. This routine employs the acceleration curve (the lower portion of hysteresis loop shown in FIG. 5) as the nominal corrected N1 versus corrected N2 curve and adds an adjustment factor corresponding to the hysteresis gap if a deceleration condition is detected. The value of this hysteresis gap generally depends upon the CVG actuation system and engine design.

The first step in the CVG hysteresis adjustment routine 220 is a conditional which determines whether the core speed has increased or decreased between the current and immediately previous cycle of the master routine 212. If an increase in N2 is detected, control flows to operation block 222. Operation block 222 stores N2DELA as the increase in N2 since the lowest core speed N2L of the most recent deceleration. Also, N2H, the highest core speed attained in the most recent acceleration is set to N2. Conversely, if N2 decreases or no change is detected in the first conditional, then control flows to operation block 224. Operation block 224, assigns N2DELA the difference between N2 and N2H (always $\leq 0$ given the decrease or no change status). Furthermore, N2L is set to the current N2.

After either operation block 222 or 224 is performed, a second conditional is encountered in which N2DELA is compared to determine if a positive increase exceeds a threshold value DELA indicative of acceleration. The specific value of DELA is determined empirically for the specific engine design. If N2DELA is greater than DELA, acceleration is declared and operation block 226 is encountered which sets the CVG hysteresis adjustment factor DN2ACC to zero because the nominal curve already assumes an acceleration condition. Control then returns to master routine 212. Conversely, if acceleration is not detected, a third conditional is encountered which determines if a speed decrease, a negative value for N2DELA, is less than negative DELA. If so, a deceleration is detected and control flows to operation block 228 wherein DN2ACC is set to the estimated hysteresis gap value DECDEL.

Control then passes back to master routine 212. It should be noted that, if $-DELA \leq N2DELA \leq DELA$, operation blocks 226 and 228 are both bypassed leaving the adjustment factor DN2ACC set to the value of the prior master routine 212 cycle.

Referring back to FIG. 4, after the CVG hysteresis adjustment routine 220 is executed, an enable routine 230 is encountered. This routine checks various criteria to determine whether the current cycle should be aborted. The result of enable routine 230 is passed back to master routine 212 as variable signal ENABLE which is checked in the subsequent conditional. If ENABLE=TRUE, then the current master routine 212 cycle continues, otherwise it terminates.

Figure 7:
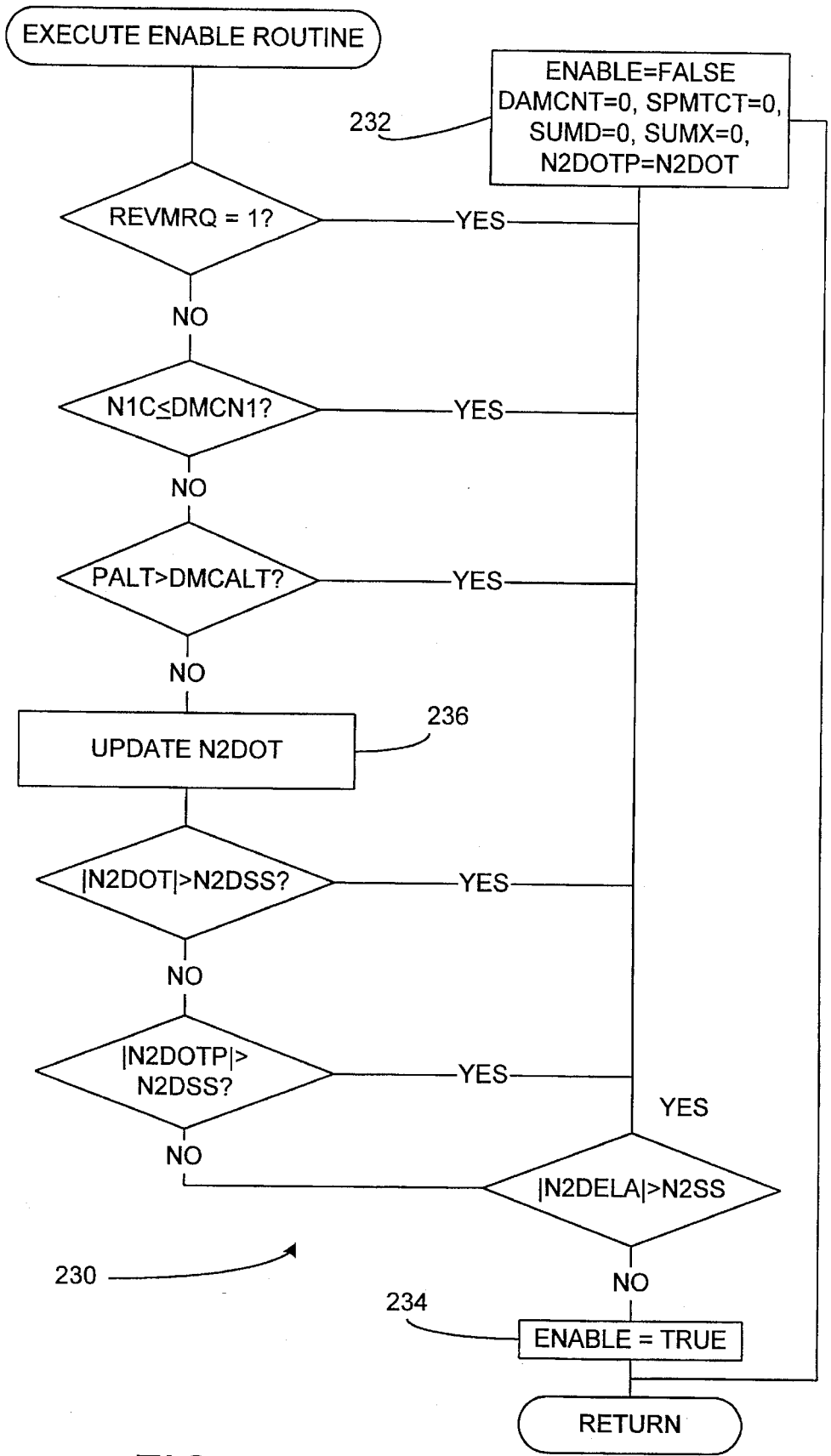
FIG. 7 is a more detailed flow chart of the enable routine depicted in FIG. 4.

Referring to FIG. 7, the enable routine is more fully described. Notably, six conditionals are serially linked such that satisfying the criteria of any of the six will result in setting ENABLE=FALSE and resetting variables for the next cycle. Conversely, if all the conditionals are satisfied, then ENABLE=TRUE and control returns to the master routine 212 for continued execution of the current cycle.

The first conditional checks whether a reversionary mode has been entered which results when ADC 70 fails. This reversionary mode is indicated by REVMRQ=1. The second conditional is whether the corrected speed of the low pressure spool 20, N1C, is less than or equal to a minimum take-off speed for the given engine design. This take-off speed is stored in variable DMCN1. The third conditional is whether the altitude of the system PALT exceeds the ceiling above which foreign object ingestion damage need not be checked. For one embodiment, this ceiling is 18,000 feet.

Next, operation block 236 is encountered which determines N2DOT. N2DOT is a running average of the variation of N2 over the most recent five cycles divided by the duration of those five cycles. Consequently, N2DOT is a measure of rotational acceleration, and is useful in determining whether steady state operation exists.

The remaining three conditionals are used to determine whether the engine is operating in a steady state. First, the absolute value of N2DOT is compared to N2DSS. N2DSS is the maximum acceleration change which is still considered within steady state operation. Second, the absolute value of N2DOT from the previous cycle N2DOTP is compared to N2DSS. Third, the CVG hysteresis adjustment routine 220 value indicative of speed change N2DELA is compared to N2SS. N2SS is a speed change threshold empirically determined as indicative of steady state performance for the given engine design. In lieu of these three checks, it is envisioned that a number of different steady state criteria may be devised as would occur to one skilled in the art.

Figure 8:
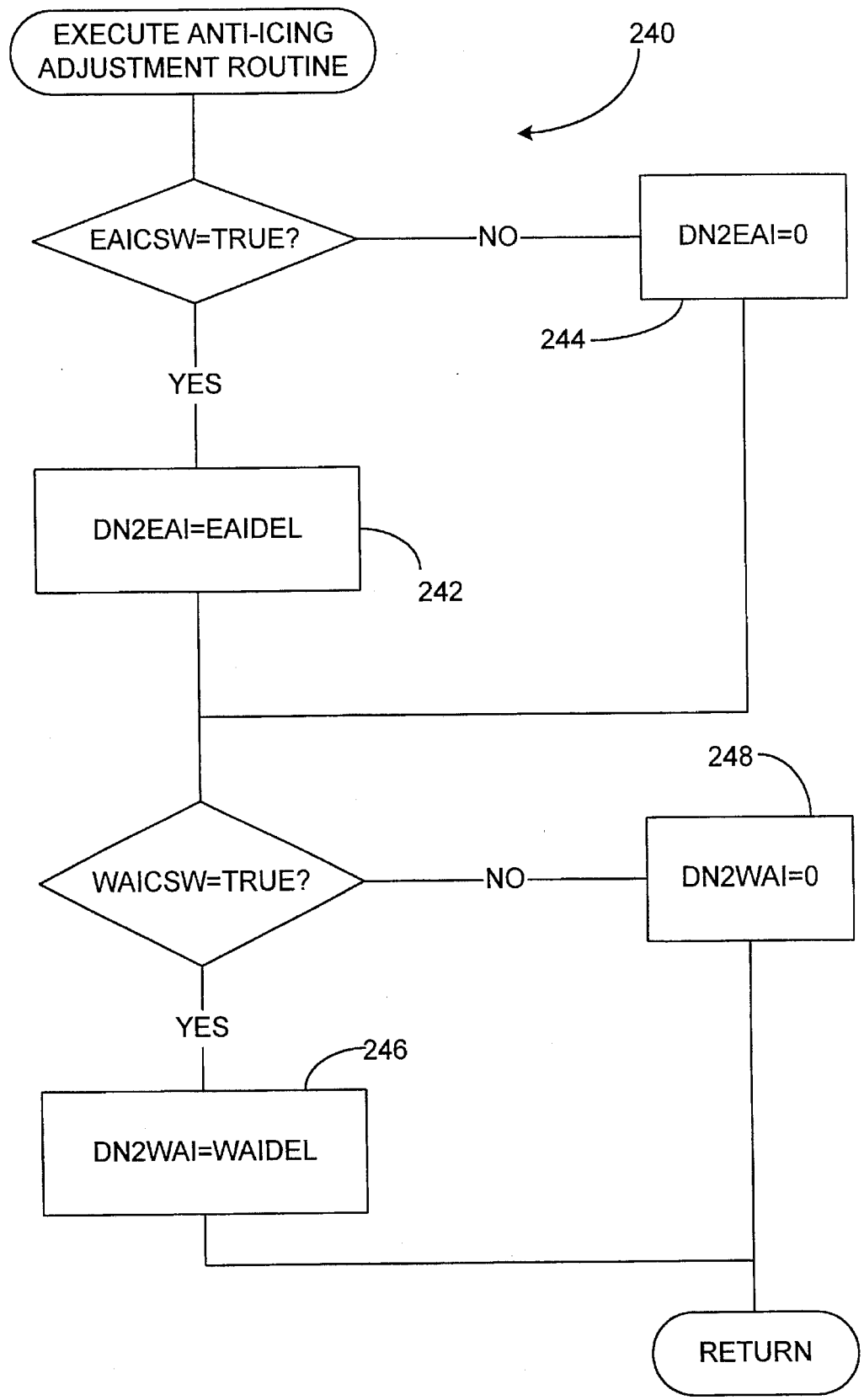
FIG. 8 is a more detailed flow chart of the anti-icing adjustment routine depicted in FIG. 4.

Upon returning from enable routine 230 and assuming ENABLE=TRUE, the next operation block encountered is anti-icing adjustment routine 240. This routine accounts for N2 changes when anti-icing systems are activated which bleed gas turbine engine 15 causing N2 to change. Referring to FIG. 8, first, engine anti-icing switch EAICSW is checked. If TRUE, operation block 242 sets adjustment factor DN2EAI to a value EAIDEL which is empirically determined to compensate for engine anti-icing bleed. Operation block 244 sets DN2EAI to zero if switch EAICSW is not set.

Next, wing anti-icing switch WAICSW is checked. If WAICSW=TRUE, then operation block 246 is encountered, and wing anti-ice adjustment factor DN2WAI is set to WAIDEL. WAIDEL is empirically determined, too. If WAICSW=FALSE, operation block 248 sets DN2WAI to zero. In other preferred embodiments, the anti-icing factors are not required because such equipment does not impact N2 or the impact can be neglected.

Figure 9:
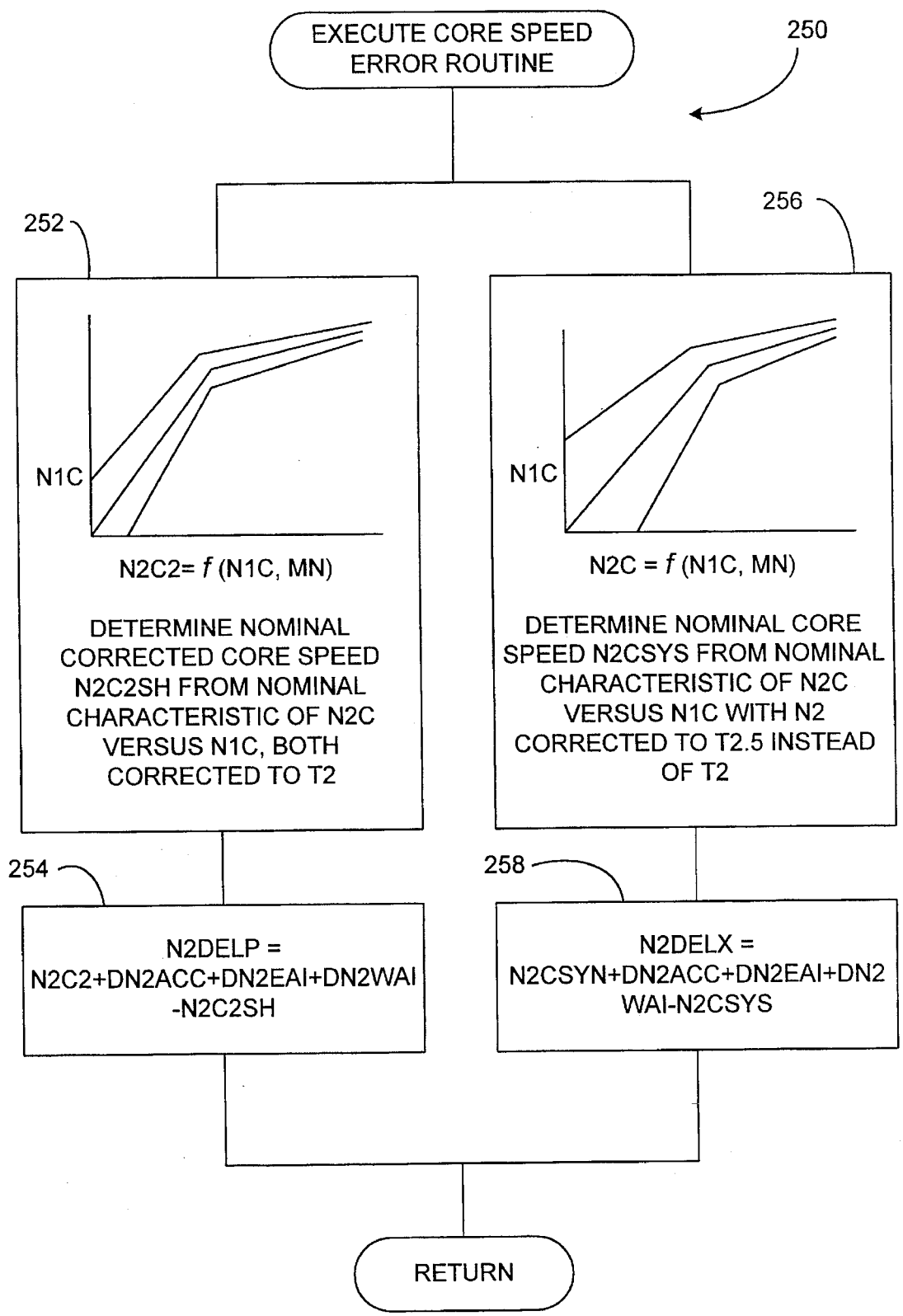
FIG. 9 is a more detailed flow chart of the core speed error routine depicted in FIG. 4.

Returning to FIG. 4, the next routine encountered is core speed error routine 250. Referring specifically to FIG. 9, two parallel sequences of operations exist. First, operation block 252 provides expected speed signal, N2C2SH, corrected to T2, from an N1C versus N2C2 operating characteristic relationship using N1C and MN as measured for the current cycle. This characteristic signal is represented by the family of curves in block 252. In operation block 254, damage error N2DELP is established by adding all speed adjustment factors to the measured N2C2 value, then subtracting the expected core speed value N2C2SH obtained from operation block 252. Similarly, a synthesized core speed N2CSYS is derived in operation block 256, but in this case, the curve represents an operating characteristic relationship with N2 corrected to T2.5. N2CSYS is used in operation block 258 to determine N2DELX similar to the N2DELP determination in operation block 254. However, instead of using N2C2, N2CSYN corrected to synthesized T2.5 is used.

Both N2DELP and N2DELX are intermediate values used in the remaining portion of the current cycle of master routine 212. Returning to FIG. 4, the next routine for the damage detection system 200 is speed match routine 260. This routine provides a speed match value, N2DELM, which accounts for the deviation of a specific engine from nominal. Also, this routine compares N2DELM to the most recent N2DELP calculated to determine if damage has occurred. N2DELX is processed in parallel with N2DELP to provide a synthesized speed match value for use in fan damage accommodation logic 160 (see FIG. 3 and accompanying text).

Speed match routine 260 is based on the principle that a consistent damage error over several cycles characterizes the deviation of a specific engine from a nominal N1 versus N2 characteristic (or one in which either N1, N2, or both are corrected to various temperatures). As a result, the speed match value N2DELM is computed as a rolling average of N2DELP. For the embodiment shown, this averaging of N2DELP does not start until a first number of cycles occurs. Next, N2DELP is consecutively summed over a second number of cycles. The average is then intermediately calculated at the conclusion of this second number of cycles, but no N2DELM is assigned. Where no N2DELM exists yet, N2DELM is immediately assigned this intermediate average. However, once N2DELM has been established, a new N2DELM is not assigned the intermediate average calculated as above until the passage of a third number of cycles beyond the first and second number of cycles. This method of accounting for engine variation can be adjusted in a variety of ways as would occur to one skilled in the art.

Figure 10:
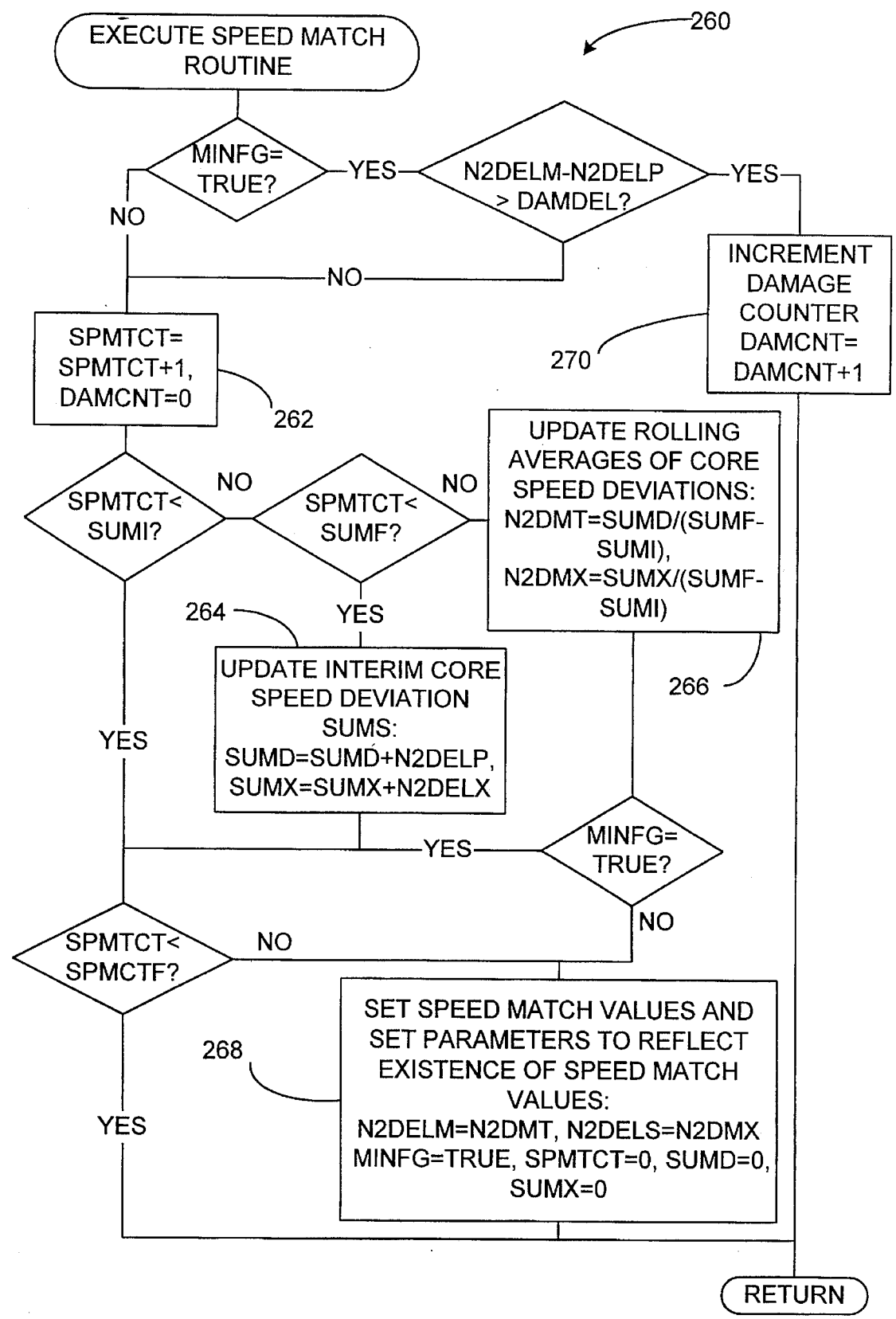
FIG. 10 is a more detailed flow chart of the speed match routine depicted in FIG. 4.

Having generally described the speed match routine 260, a more detailed description is now provided by reference to FIG. 10. This routine begins by checking whether an N2DELM has been calculated yet, satisfied when MINFG=TRUE. If not, operation block 262 increments counter SPMTCT and zeroes damage counter DAMCNT. The next conditional encountered is whether SPMTCT<SUMI. SUMI corresponds to the first number of initial cycles required before summation of N2DELP begins. Assuming SPMTCT is less than SUMI, control passes to another conditional which checks whether SPMTCT<SPMCTF. SPMCTF corresponds to the first and second number of cycles which must pass to calculate an initial N2DELM plus the third number of cycles that must pass before N2DELM is updated. Consequently, SPMCTF is greater than SUMI and control will return to master routine 212 with DAMCNT=0.

This flow is repeated until SUMI cycles occur in which case a conditional SPMTCT <SUMF is encountered. Assuming that SUMF cycles have not yet occurred, then a running total of N2DELP and N2DELX is executed in operation block 264 storing the results to SUMD and SUMX, respectively. This path is repeated until SPMTCT=SUMF in which case operation block 266 is entered and interim averages of running totals SUMD and SUMX are calculated and stored as N2DMT and N2DMX, respectively. Assuming no N2DELM and N2DELS have yet been assigned, MINFG is still not TRUE. As a result, control flows to operation block 268 where N2DELM and N2DELS are initially assigned the interim average values of N2DMT and N2DMX, respectively. Also, MINFG is now set to TRUE and remains so until the controller 50 is powered down. Furthermore, the counter SPMTCT and the running totals SUMD and SUMX are all zeroed in anticipation of the next N2DELM and N2DELS calculation.

Because MINFG=TRUE for the next cycle, the difference between N2DELM and N2DELP is compared to a threshold DAMDEL indicative of damage. In effect, this damage detection comparison accounts for the deviation adjustment value N2DELM by using the difference with the current cycle damage error N2DELP. Notably, a negative N2DELP is expected when damage occurs corresponding to an N2 drop. Alternatively, the threshold DAMDEL could be adjusted by N2DELM. If (N2DELM−N2DELP)>DAMDEL, damage counter DAMCNT is incremented before returning to the master routine 212.

Returning to FIG. 4, it should be noted that when DAMCNT≧DAMDET, the damage accommodation mode is triggered as indicated in operation block 218. The threshold value DAMDEL is empirically determined and corresponds to the amount of damage that can be tolerated versus the amount of acceptable false damage triggers. Furthermore, DAMDEL can be empirically selected to correspond to a given thrust loss using a known relationship between core speed N2 and thrust. Also, DAMDEL can be adjusted to account for other factors such as N2 sensor tolerance and fluctuation, and environmental control system bleed on the engine.

Returning to FIG. 10, if DAMDEL is not exceeded by N2DELM−N2DELP, then the counter SPMTCT is incremented and DAMCNT is zeroed in operation block 262. As a result, DAMCNT cannot equal or exceed DAMDET unless DAMCNT is incremented consecutively to exceed the DAMDET limit. Because SPMTCT was set to zero when the N2DELM was first assigned, SUMI cycles must occur again before summation in operation block 264 resumes. Similarly, interim averages of operation block 266 are not recalculated until SUMF cycles occur again. Furthermore, because MINFG=TRUE, SPMCTF cycles must occur before new N2DELM and N2DELS values are assigned from interim averages N2DMT and N2DMX, respectively, in operation block 268. This updating process of N2DELM and N2DELS continues every SPMCTF cycles until the controller 50 is powered off or DAMCNT≧DAMDET. In one variation of this embodiment, SPMCTF is set equal to SUMF so that there is essentially no third number of cycles before updates to N2DELM and N2DELS occur. In other preferred embodiments, the number of cycles SUMI and SUMF as well as SPMCTF can be varied as would occur to one of skill in the art.

Notably, damage detection system 200 accounts for a number of adjustments and corrections. However, in an alternative preferred embodiment, CVG and anti-icing equipment may not be used so that these adjustments are not necessary. Moreover, temperature correction factors and Mach Number variability for a given N1 versus N2 characteristic may be ignored in other preferred embodiments. Consequently, in one preferred embodiment, a damage detection routine can be devised where the damage error is essentially the difference between a sensed N2 and an expected speed of N2 determined from N1 using a known operating characteristic. Moreover, in this embodiment, the core speed can be directly compared to a threshold indicative of damage in lieu of the extra steps to adjust for deviations from nominal. This embodiment is especially viable when variation from nominal is negligible. Similarly, other embodiments need not delay damage detection and accommodation until a threshold count, like DAMDET, is reached. Indeed, this count is a function of cycle time which may be adjusted as well.

For any two freely rotating members in a gas turbine engine, both driven by working fluid flowing therethrough, a unique operating relationship can be established. Thus, by using this relationship, and sensing the speed of one of the rotating members, an expected speed for the other rotating member can be determined. This expected speed can be compared to the actual speed of the other rotating member and damage declared when the difference exceeds a threshold. Thus, the damage detection system of the present invention can be applied to a gas turbine engine with two or more rotating members driven by working fluid. In one preferred embodiment, a dedicated damage detection rotating member can be used for the purpose of characterizing its relationship to all the other freely rotating members. These characterizations are then used to calculate expected speeds knowing the measured speed of the rotating member. Damage to the characterized rotating members can be monitored by comparing the expected speed to their measured speed, and an appropriate accommodation mode responsive to the detected damage can be triggered when such damage is found.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for detecting gas turbine engine damage, comprising:

a gas turbine engine defining a working fluid pathway and including a first rotating member and a second rotating member, each of said first and second rotating members being configured to rotate in response to a working fluid flowing along said pathway;

a first sensor providing a first speed signal corresponding to rotational speed of said first rotating member;

a second sensor providing a second speed signal corresponding to rotational speed of said second rotating member; and a controller coupled to said first and second speed sensors, said controller including:

an expected speed signal determined from said first speed signal;

a damage error signal determined from comparison of said expected speed signal to said second speed signal;

a damage detection signal determined from comparison of said damage error signal and a threshold indicative of damage to said first rotating member;

said controller being responsive to said damage detection signal to activate a damage accommodation mode.

2. The system of claim 1, wherein said first rotating member includes a compressor.

3. The system of claim 1, wherein:

said first rotating member includes a first spool;

said second rotating member includes a second spool, said second spool being coaxial with said first spool along a rotational axis.

4. The system of claim 1, further comprising a thrust modulator coupled to said controller and said engine, and wherein said controller further includes:

a request speed signal, said requested speed signal corresponding to an undamaged first rotating member speed required to obtain a desired thrust from said engine;

a first control error signal determined by comparing said requested speed signal to said first speed, said thrust modulator being responsive to said first control error signal to modulate thrust of said engine.

5. The system of claim 4, wherein said controller further includes:

a synthesized speed signal determined from said second speed;

a second control error signal generated in response to said damage detection signal by comparing said requested speed signal to said synthesized speed signal, said thrust modulator being responsive to said second control error signal to modulate thrust of said engine.

6. The system of claim 1, further comprising a temperature sensor coupled to said controller, said temperature sensor providing a temperature signal, and wherein said controller corrects said first speed signal and said second speed signal to said temperature signal.

7. The system of claim 1, wherein said controller generates a compressor variable geometry hysteresis adjustment signal and an engine bleed signal, and said damage error signal is further determined from said compressor variable geometry hysteresis adjustment signal and said engine bleed signal.

8. The system of claim 1, wherein said controller generates a deviation adjustment signal, said deviation adjustment signal establishing said second speed signal deviation from a nominal engine characteristic, and said damage detection signal is further determined from said deviation adjustment signal.

9. The system of claim 1, wherein said controller includes an operating characteristic signal, said characteristic signal corresponding to an operating relationship between speed of said first and second rotating members, and said expected speed signal is further determined from said characteristic signal.

10. The system of claim 1, further comprising a mach number sensor coupled to said controller, said mach number sensor providing a mach number signal, and wherein said expected speed signal is further determined from said mach number signal.

11. The system of claim 1, further comprising a temperature sensor providing a temperature signal and a mach number sensor providing a mach number signal, each of said temperature sensor and said mach number sensor being coupled to said controller, and wherein:

said controller generates:

a compressor variable geometry hysteresis adjustment signal from said second speed signal;

an engine bleed signal;

a deviation adjustment signal from said damage error signal, said deviation adjustment signal establishing said second speed signal deviation from a nominal engine;

an operating characteristic signal, said characteristic signal corresponding to an operating relationship between speed of said first and second rotating members;

said controller corrects said first speed signal and said second speed signal to said temperature signal;

said expected speed signal is further determined from said mach number signal and said characteristic signal;

said damage error signal is further determined from said compressor variable geometry hysteresis adjustment signal and said engine bleed signal; and said damage detection signal is further determined from said deviation adjustment signal.

12. The system of claim 11, wherein:

said first rotating member includes a first spool with a first compressor linked by an inner shaft to a first turbine, said compressor having a fan stage;

said second rotating member includes a second spool with a second compressor linked by an outer shaft to a second turbine, said inner shaft being coaxial with said outer shaft along a rotational axis, said second compressor and said second turbine being positioned between said first compressor and said first turbine.

13. A method for detecting damage to a gas turbine engine, the engine defining a pathway therethrough and having a first rotating member and a second rotating member, each of said first and second rotating members rotating in response to the flow of a working fluid along the pathway, comprising the steps of:

(1) sensing a first speed of the first rotating member;

(2) sensing a second speed of the second rotating member;

(3) establishing an expected speed from the first speed;

(4) determining a damage error by comparing the second speed to the expected speed;

(5) detecting damage from a comparison of the damage error and a threshold indicative of damage to the gas turbine engine;

(6) recovering thrust in response to step (5).

14. The method of claim 13, further comprising the steps of:

(7) sensing a temperature;

(8) correcting said first speed and said second speed for the temperature;

(9) adjusting the damage error for compressor variable geometry hysteresis;

(10) adjusting the damage error for engine bleed;

(11) establishing a deviation of the engine from nominal;

(12) adjusting the comparison of step (5) with the deviation of step (11).

15. The method of claim 13, further comprising the steps of:

(7) repeating steps (1) through (4) periodically;

(8) establishing a deviation of the engine from nominal from step (7).

16. The method of claim 13, wherein step (6) further includes the step of switching thrust control modes.

17. The method of claim 13, further comprising the step of adjusting the comparison of step (5) for a deviation of the engine from nominal.

18. The method of claim 13, further comprising the step of repeating step (5) before step (6).

19. The method of claim 13, wherein step (3) further includes the step of using a characteristic relationship between the first speed and the second speed.

20. An operating system, comprising:

a gas turbine engine defining a pathway and including a first rotating member and a second rotating member, each of said first and second rotating members being configured to rotate in response to working fluid flowing along said pathway;

a first speed sensor providing a first speed signal corresponding to speed of said first rotating member;

a second sensor providing a second speed signal corresponding to speed of said second rotating member;

a controller coupled to said first and second speed sensors, said controller including:
a requested speed signal, said requested speed signal corresponding to a desired thrust from said engine;
a first control error signal determined by comparing said requested speed signal to said first speed signal;
a damage detection signal generated when said first rotating member is damaged;
a synthesized speed signal determined from said second speed signal, said synthesized speed signal corresponding to expected speed of an undamaged first rotating member;
a second control error signal generated in response to said damage detection signal by comparing said requested speed signal to said synthesized speed signal; and a thrust modulator coupled to said controller and said engine, said modulator being responsive to said first and second control error signals to modulate thrust of said engine.

21. The system of claim 20, wherein said first rotating member includes a compressor with a fan stage.

22. The system of claim 20, wherein:

said first rotating member includes a first spool;

said second rotating member includes a second spool, said second spool being coaxial with said first spool along a rotational axis.

23. The system of claim 20, wherein said thrust modulator includes a fuel regulator.

24. The system of claim 20, further comprising a throttle coupled to said controller, said throttle providing a throttle signal corresponding to the desired thrust, said controller generating said requested speed signal from said throttle signal.

25. The system of claim 20, wherein said controller further includes an expected speed signal determined from said first speed signal, a damage error signal determined from comparison of said expected speed signal to said second speed signal, and said damage detection signal is determined from comparison of said damage error signal and a threshold indicative of damage to said first rotating member.

26. The system of claim 25, further comprising a temperature sensor providing a temperature signal and a mach number sensor providing a mach number signal, each of said temperature sensor and said mach number sensor being coupled to said controller, and wherein:

said controller generates:
a compressor variable geometry hysteresis adjustment signal from said second speed signal;
an engine bleed signal;
a deviation adjustment signal from said damage error signal, said deviation adjustment signal establishing said second speed signal deviation from a nominal engine;
an operating characteristic signal, said characteristic signal corresponding to an operating relationship between speed of said first and second rotating members;

said controller corrects said first speed signal and said second speed signal to said temperature signal;

said expected speed signal is further determined from said mach number signal and said characteristic signal;

said damage error signal is further determined from said compressor variable geometry hysteresis adjustment signal and said engine bleed signal;

said damage detection signal is further determined from said deviation adjustment signal.

27. The system claim 20, further comprising a mach number sensor coupled to said controller and providing a mach number signal, a throttle coupled to said controller and providing a throttle signal corresponding to the desired thrust, and wherein:

said requested speed signal is determined from said throttle signal;

said controller generates:
a deviation adjustment signal, said deviation adjustment signal establishing said second speed signal deviation from a nominal engine;
a synthesized temperature signal;
an operating characteristic signal, said characteristic signal corresponding to an operating relationship between speed of said first rotating member and speed of said second rotating member;

said synthesized speed signal is corrected to said synthesized temperature signal;

said synthesized speed signal is further determined from said mach number signal, said deviation adjustment signal, and said characteristic signal.

28. A method for operating a gas turbine engine, the engine defining a pathway therethrough and having a first rotating member and a second rotating member, each of said first and second rotating members rotating in response to the flow of a working fluid along the pathway, comprising the steps of:

(1) controlling thrust of the engine in response to an actual speed of the first rotating member;

(2) detecting damage to the first rotating member; and (3) controlling thrust of the engine in response to a synthesized speed determined from said second rotating member following step (2).

29. The method of claim 28, wherein step (2) includes the steps of:

(2a) sensing a first speed of the first rotating member;

(2b) sensing a second speed of the second rotating member;

(2c) establishing an expected speed from the first speed;

(2d) determining a damage error by comparing the second speed to the expected speed;

(2e) detecting damage from a comparison of the damage error and a threshold indicative of damage to the gas turbine engine.

30. The method of claim 28, wherein step (3) includes the steps of:

(3a) determining a requested speed for the first rotating member corresponding to a desired thrust;

(3b) sensing a second rotating member speed;

(3c) establishing a synthesized speed for the first rotating member from the second rotating member speed;

(3d) generating a control error by comparing the requested speed to the synthesized speed; and (3e) modulating thrust of the gas turbine engine in response to the control error.

31. A system for controlling thrust, comprising:

a gas turbine engine defining a working fluid pathway, said engine including a first rotating member and a second rotating member, each of said first and second rotating members being configured to rotate in response to working fluid flowing along said pathway;

a speed sensor providing a speed signal corresponding to rotational speed of said second rotating member;

a controller coupled to said speed sensor, said controller including:

a requested speed signal corresponding to a first rotating member speed required to obtain a desired thrust from said engine;

a synthesized speed signal corresponding to expected speed of said first rotating member, said synthesized speed signal being determined from said speed signal;

a damage signal indicative of damage to said first rotating member;

a control error signal determined by comparing said requested speed signal to said synthesized speed signal in response to said damage signal; and a thrust modulator coupled to said controller and said engine, said thrust modulator being responsive to said control error signal to modulate thrust of said engine.

32. The system of claim 31, wherein said first rotating member includes a compressor with a fan stage.

33. The system of claim 31, wherein:

said first rotating member includes a first spool;

said second rotating member includes a second spool, said second spool being coaxial with said first spool along a rotational axis.

34. The system of claim 31, wherein said modulator includes a fuel regulator.

35. The system of claim 31, further comprising a throttle coupled to said controller, said throttle providing a throttle signal corresponding to the desired thrust, said controller generating said requested speed signal from said throttle signal.

36. The system of claim 31, wherein said controller generates a deviation adjustment signal, said deviation adjustment signal establishing said speed signal deviation from a nominal engine, and said synthesized speed signal is further determined from said deviation adjustment signal.

37. The system of claim 31, wherein said controller generates a synthesized temperature signal, and said synthesized speed signal is corrected to said synthesized temperature signal.

38. The system of claim 31, further comprising a mach number sensor coupled to said controller, said mach number sensor providing a mach number signal, and wherein said synthesized speed signal is further determined from said mach number signal.

39. The system of claim 31, wherein said controller includes an operating characteristic signal, said characteristic signal corresponding to an operating relationship between speed of said first and second rotating members, and said synthesized speed signal is further determined from said characteristic signal.

40. The system of claim 31, further comprising a mach number sensor coupled to said controller and providing a mach number signal, a throttle coupled to said controller and providing a throttle signal corresponding to the desired thrust, and wherein:

said requested speed signal is determined from said throttle signal;

said controller generates:

a deviation adjustment signal, said deviation adjustment signal establishing said speed signal deviation from a nominal engine;

a synthesized temperature signal;

an operating characteristic signal, said characteristic signal corresponding to an operating relationship between speed of said first rotating member and speed of said second rotating member;

said synthesized speed signal is corrected to said synthesized temperature signal;

said synthesized speed signal is further determined from said mach number signal, said deviation adjustment signal, and said characteristic signal.

41. The system of claim 31, further comprising:

a first rotating member speed sensor coupled to said controller and providing a first rotating member speed signal;

a temperature sensor coupled to said controller and providing a temperature signal; and wherein said synthesized speed signal is further determined from said first rotating member speed signal and said temperature signal.

42. A system for controlling thrust, comprising:

a gas turbine engine defining a working fluid pathway, said engine including a first rotating member and a second rotating member, each of said first and second rotating members being configured to rotate in response to working fluid flowing along said pathway;

a speed sensor providing a speed signal corresponding to rotational speed of said second rotating member;

a controller coupled to said speed sensor, said controller including:

a requested speed signal corresponding to a first rotating member speed required to obtain a desired thrust from said engine;

a deviation adjustment signal establishing said speed signal deviation from a nominal engine;

a synthesized speed signal corresponding to expected speed of said first rotating member, said synthesized speed signal being determined from said speed signal and said deviation signal;

a control error signal determined by comparing said requested speed signal to said synthesized speed signal; and a thrust modulator coupled to said controller and said engine, said thrust modulator being responsive to said control error signal to modulate thrust of said engine.

43. The system of claim 42, wherein said first rotating member includes a compressor with a fan stage.

44. The system of claim 42, wherein:

said first rotating member includes a first spool;

said second rotating member includes a second spool, said second spool being coaxial with said first spool along a rotational axis.

45. The system of claim 42, wherein said controller includes a synthesized temperature signal and said speed signal is corrected to said synthesized temperature signal.

46. The system of claim 42, further comprising a throttle coupled to said controller, said throttle providing a throttle signal corresponding to the desired thrust, said controller generating said requested speed signal from said throttle signal.

47. A system for controlling thrust, comprising:

a gas turbine engine defining a working fluid pathway, said engine including a first rotating member and a second rotating member, each of said first and second rotating members being configured to rotate in response to working fluid flowing along said pathway;

a speed sensor providing a speed signal corresponding to rotational speed of said second rotating member;

a controller coupled to said speed sensor, said controller including:

a requested speed signal corresponding to a first rotating member speed required to obtain a desired thrust from said engine;

a synthesized temperature signal;

a synthesized speed signal corresponding to expected speed of said first rotating member, said synthesized speed signal being determined from said speed signal and being corrected to said synthesized temperature signal;

a control error signal determined by comparing said requested speed signal to said synthesized speed signal; and a thrust modulator coupled to said controller and said engine, said thrust modulator being responsive to said control error signal to modulate thrust of said engine.

48. The system of claim 47, wherein said first rotating member includes a compressor with a fan stage.

49. The system of claim 47, wherein:

said first rotating member includes a first spool;

said second rotating member includes a second spool, said second spool being coaxial with said first spool along a rotational axis.

50. The system of claim 47, wherein said controller includes a mach number signal and said synthesized speed signal is further determined from said mach number signal.

51. The system of claim 47, further comprising a throttle coupled to said controller, said throttle providing a throttle signal corresponding to the desired thrust, said controller generating said requested speed signal from said throttle signal.

52. A system for controlling thrust, comprising:

a gas turbine engine defining a working fluid pathway, said engine including a first rotating member and a second rotating member, each of said first and second rotating members being configured to rotate in response to working fluid flowing along said pathway;

a speed sensor providing a speed signal corresponding to rotational speed of said second rotating member;

a controller coupled to said speed sensor, said controller including:

a requested speed signal corresponding to a first rotating member speed required to obtain a desired thrust from said engine;

a mach number signal;

a synthesized speed signal corresponding to expected speed of said first rotating member, said synthesized speed signal being determined from said speed signal and said mach number signal;

a control error signal determined by comparing said requested speed signal to said synthesized speed signal; and a thrust modulator coupled to said controller and said engine, said thrust modulator being responsive to said control error signal to modulate thrust of said engine.

53. The system of claim 52, wherein said first rotating member includes a compressor with a fan stage.

54. The system of claim 52, wherein:

said first rotating member includes a first spool;

said second rotating member includes a second spool, said second spool being coaxial with said first spool along a rotational axis.

55. The system of claim 52, further comprising a throttle coupled to said controller, said throttle providing a throttle signal corresponding to the desired thrust, said controller generating said requested speed signal from said throttle signal.

56. The system of claim 52, wherein said controller includes a deviation adjustment signal, said deviation adjustment signal being configured to establish said speed signal deviation from a nominal engine, and said synthesized speed signal being further determined from said deviation adjustment signal.

57. The system of claim 31, further comprising a first member speed sensor providing a first member speed signal corresponding to rotational speed of said first rotating member, and wherein said damage signal is determined by comparing said speed signal to said first member speed signal.

58. The system of claim 31, wherein said controller generates a compressor variable geometry hysteresis adjustment signal and said damage signal is further determined from said compressor variable geometry hysteresis adjustment signal.

* * * * *